United States Patent
Van Gerrevink (10) Patent No.: US 6,950,405 B2
(45) Date of Patent: Sep. 27, 2005

(54) TRAFFIC STREAM GENERATOR HAVING A NON-CONSECUTIVE ADDRESSING MECHANISM

(75) Inventor: Dean Van Gerrevink, Vancouver (CA)

(73) Assignee: Agilent Technologies, Inc., Palo Alto, CA (US)

( * ) Notice: Subject to any disclaimer, the term of this patent is extended or adjusted under 35 U.S.C. 154(b) by 885 days.

(21) Appl. No.: 09/906,882

(22) Filed: Jul. 16, 2001

(65) Prior Publication Data

US 2003/0012141 A1 Jan. 16, 2003

(51) Int. Cl.[7] ................................ H04J 1/16; H04J 3/14
(52) U.S. Cl. .................... 370/252; 370/412; 370/392
(58) Field of Search ........................ 370/241, 242, 370/243, 244, 245, 247, 250, 251, 252, 253, 389, 392, 393, 412, 537; 709/221–225; 340/825.5, 825.51, 3.5, 3.53, 3.54; 702/182, 183, 185

(56) References Cited

U.S. PATENT DOCUMENTS

| | | | | |
|---|---|---|---|---|
| 5,526,283 A | * | 6/1996 | Hershey et al. | 709/224 |
| 5,586,266 A | * | 12/1996 | Hershey et al. | 702/182 |
| 5,812,529 A | * | 9/1998 | Czarnik et al. | 370/245 |
| 6,028,847 A | * | 2/2000 | Beanland | 370/252 |
| 6,137,782 A | * | 10/2000 | Sharon et al. | 370/255 |
| 6,252,872 B1 | * | 6/2001 | Tzeng | 370/360 |
| 6,414,942 B1 | * | 7/2002 | Ito et al. | 370/250 |
| 6,606,721 B1 | * | 8/2003 | Gowin et al. | 714/728 |
| 6,744,783 B1 | * | 6/2004 | Tzeng | 370/469 |
| 6,798,746 B1 | * | 9/2004 | Kloth et al. | 370/235 |
| 2002/0015387 A1 | * | 2/2002 | Houh | 370/250 |
| 2002/0093917 A1 | * | 7/2002 | Knobbe et al. | 370/252 |
| 2002/0105911 A1 | * | 8/2002 | Pruthi et al. | 370/241 |

* cited by examiner

*Primary Examiner*—Ajit Patel
*Assistant Examiner*—Chirag Shah (57) ABSTRACT

An apparatus for testing equipment has a storage that includes a packet template area for storing at least a first packet template and a second packet template and a source/destination address pair area for storing at least a first set of source/destination address pairs. The source/destination address pairs are configurable to simulate non-consecutive network traffic (e.g., Internet traffic). A stream generator receives a profile identifier and responsive thereto dynamically accesses the packet template area corresponding to the profile specified by the profile identifier for at least one packet template and accesses the source/destination address pairs corresponding to the packet template for at least one address pair, and builds a test packet that includes the accessed packet template and the accessed address pair.

19 Claims, 6 Drawing Sheets

TRAFFIC STREAM GENERATOR HAVING A NON-CONSECUTIVE ADDRESSING MECHANISM

FIELD OF THE INVENTION

The present invention relates generally to test equipment, and more specifically, to a traffic stream generator which functions to generate digital traffic for equipment to be tested.

BACKGROUND OF THE INVENTION

In the field of test equipment, it is a problem to efficiently generate an output data stream that emulates the diverse patterns of real world data transmissions. This is especially pertinent in the field of data communications for remotely located devices wherein the equipment must be operational under adverse conditions, and responsive to various patterns of input data traffic. In order to exhaustively test such equipment, diverse patterns of data traffic as well as varying traffic loads must be simulated to ensure that the equipment is operational under the conditions that exist in their installed environment.

The test equipment typically sends multiple streams of network traffic through a system under test (SUT) and forwards the streams to multiple output ports. The SUT can, for example, be a router.

For example, an IP address is 32 bits wide and consists of two components: 1) the network part and 2) the host part. These two parts can have variable width. For example, a large network containing a very large number of hosts uses only a small number of bits to represent the network part (e.g. 8 bits) and a larger number of bits (e.g., 24 bits) to represent the host part. In this case, there are $2^{24}$ distinct host addresses possible in the network.

Alternatively, a smaller network may use a larger number of bits for representing the network part of the address (e.g. 24 bits) and use a smaller number of bits (e.g., 8 bits) for representing the host part, thereby only allowing a network of 256 (i.e., $2^8$) different hosts.

An IP router typically forwards packets based on the network part of the address. IP routers exchange reachability information (e.g., network addresses or routes) between each other by utilizing routing protocols. This routing information is employed to build a forwarding table in the router. The forwarding table contains instructions on how to forward packets, whose destination address matches a particular entry in the forwarding table.

For example, an instruction may specify that if a packet matches IP Address 1/8 (where 1 is the network address, and 8 is the number of bits used to indicate the network), then forward the packet to output port X. Therefore, any packet received, where the top 8 bits of the destination IP address equals one, is forwarded to output port X.

Consequently, in order to effectively test an IP router, a mechanism must be used to configure routes (e.g., network addresses) in the forwarding table consisting of many different network sizes and network addresses.

Conventional test equipment utilize traffic generators that are either memory-based or use multiple independent traffic sources. Unfortunately, both of these approaches have their disadvantages.

Memory-based approaches transmit the contents of a memory. Although this scheme allows a large number of different packets to be sent, this approach offers very little granularity in terms of allowing a tester to control the distribution or profile of individual packets. For example, it is not possible to configure these types of traffic generators to mix very high rate traffic (e.g., traffic having data rates in the order of The second approach utilizes multiple independent traffic sources. Each source typically can only transmit a single packet or a relatively small number of different packets (e.g., 100 packets). However, each source can have an independent profile or distribution, thereby allowing high rate traffic and low rate traffic to be multiplexed.

Unfortunately, this approach is unable to configure routes (e.g., network addresses) in a forwarding table that consists of many different network sizes and network addresses.

One scheme that is utilized to increase the number of different packets when using the first approach or the second approach is to place an incrementing counter into part of the packet header. When applied to the address field, the incrementing counter allows the tester to generate thousands of different addresses in the packets. However, this scheme has significant drawbacks.

First, it is noted that the set of IP addresses received in incoming packets by a router in the backbone of the Internet are typically not localized to a certain range of addresses. Consequently, an incrementing counter is unable to generate non-consecutive addresses that are needed to simulate real network traffic.

Second, one goal of the traffic generator is to generate traffic that contains destination addresses, where the network part of these addresses corresponds to the routes that have been installed in the forwarding table of the router. The traffic is generated in such a manner that packets are predictably forwarded to a set of expected outgoing interfaces of the SUT, and therefore, received on other ports of the test system.

Within this context, a traffic stream consists of a set of packets transmitted by one port that have a set of destination addresses corresponding to the set of networks (or routes) reachable at a particular output port. These destination addresses have a range of values which depends on the value and length in bits of the network addresses. Unfortunately, it is not possible to generate such a range of addresses using an incrementing counter.

Accordingly, it is desirable to have a scheme consisting of a very large set of possible source/destination address pairs on each stream in order to provide a realistic simulation of operating conditions. Furthermore, it is desirable for there to be a mechanism that provides realistic traffic stimuli to the SUT and simulates a traffic mix that is representative of what the SUT is subjected to when connected to a live network (e.g., the Internet).

Moreover, the router (or SUT) may actually exhibit different behavior or performance based on the distribution of addresses (based on value and/or size of network prefix length). In other words, a distribution of addresses generated by an incrementing counter may not adequately test the SUT.

Based on the foregoing, it is desirable to provide a traffic stream generator that overcomes the disadvantages discussed above.

SUMMARY OF THE INVENTION

One aspect of the present invention is to provide a traffic stream generator that simulates real network traffic (e.g., Internet traffic) by generating traffic with a large number of IP addresses, by simultaneously generating different traffic classes, and by forwarding the generated traffic between different ports of the equipment under test.

According to one embodiment, the traffic stream generator has a storage that includes a packet template area for storing packet templates and a source/destination address pair area for storing source/destination address pairs that are configurable to simulate non-consecutive network traffic (e.g., Internet traffic). A stream generator receives a profile identifier and responsive thereto dynamically accesses the packet template area corresponding to the profile specified by the profile identifier for at least one packet template and accesses the source/destination address pairs corresponding to the packet template for at least one address pair, and builds a test packet that includes the accessed packet template and the accessed address pair.

In one embodiment, each traffic classes includes packet contents, packet length, and traffic profile. The packet contents can be varied to generate different categories of Internet traffic (e.g., HTTP traffic, Telnet traffic, or FTP traffic). The packet length can be varied to send long or short bursts of traffic. The traffic profile can be varied to measure the simultaneous effects of a mix of long and short packets on the equipment under test. The present invention includes a mechanism for supporting multiple traffic streams that each includes an associated traffic class, a source port, a destination, and a set of source/destination IP address pairs. At each source port, multiple streams can share the same traffic class. The user can employ traffic streams to define a mesh of traffic so that traffic generated from each source port can be sent to a variety of destination ports. The present invention also provides a mechanism for supporting a range of address pairs for each stream to enable the test system to simulate the generation of traffic from and to a large number of different network addresses.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

The traffic generation scheme is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The traffic generation scheme of the present invention is preferably employed as part of a test system to send multiple streams of network traffic (e.g., IP traffic) through a System under Test (SUT) and have those streams forwarded to multiple output ports of the SUT. The SUT can, for example, be an IP router. The traffic generation scheme of the present invention of the scheme provides realistic traffic stimuli to the SUT to simulate a traffic mix representative of what the router is subjected to when connected to a live network (e.g., the Internet).

Test System 100

Figure 1:
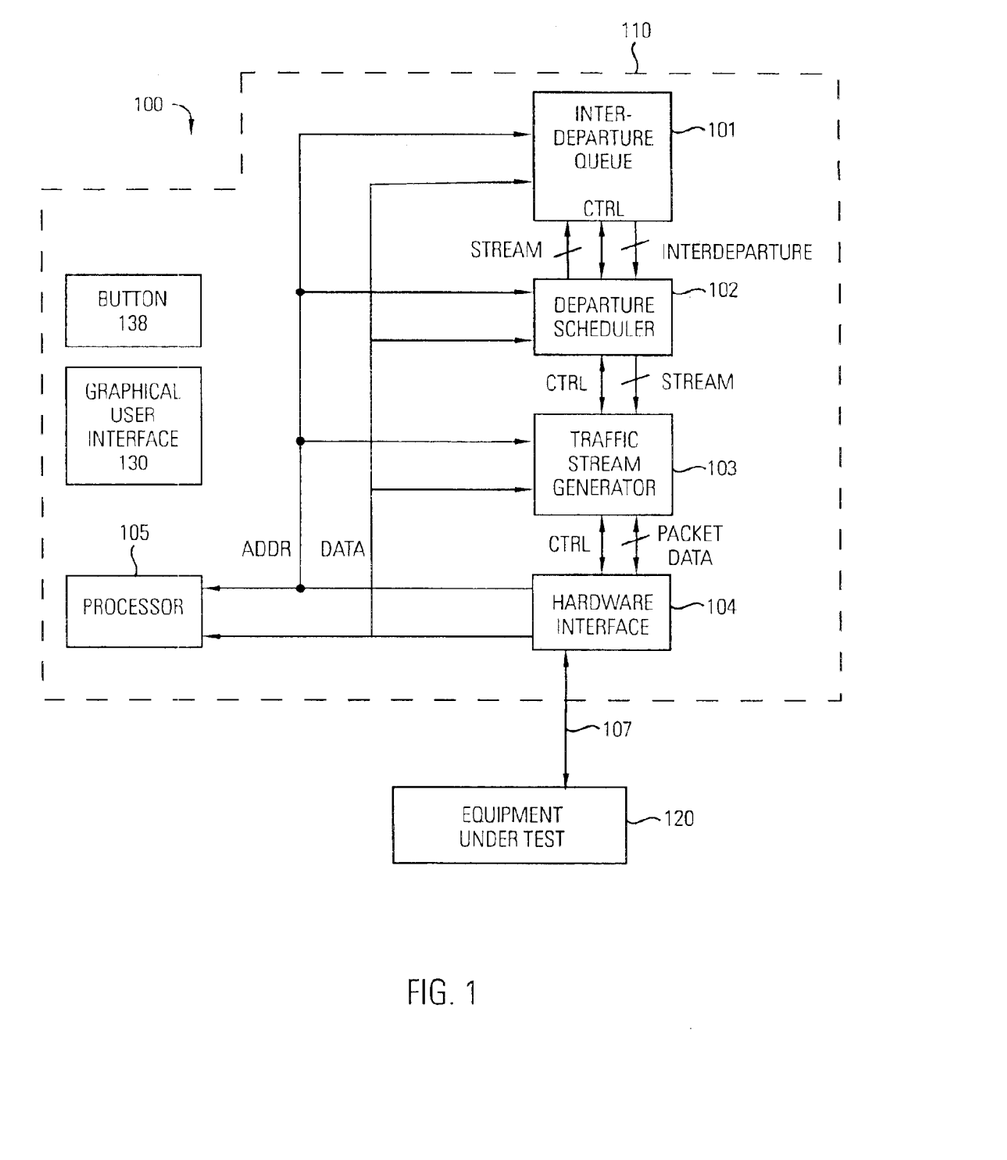
FIG. 1 is a block diagram of a test system in which the traffic stream generator of the present invention can be implemented.

FIG. 1 is a block diagram of a test system 100 in which the traffic stream generator of the present invention can be implemented. The test system 100 includes a test box 110 for coupling with an equipment under test 120 (also known as a device under test (DUT)) through conventional connectors (e.g., cables, etc.). The equipment under test 120 can include, for example, a router, switch or other network device that forwards packets to a particular destination address.

The test box 110 includes a processor 105 for executing program instructions, a graphical user interface (GUI) program 130 for interaction with a user (e.g., a test equipment operator), and a plurality of buttons 138 for allowing the user to provide input.

A traffic generator 103 of the present invention (also referred to herein as a stream generator) is provided for generating realistic network traffic (e.g., Internet traffic). The traffic generator 103 is described in greater detail hereinafter with reference to FIGS. 2 and 3.

The data generation is managed in the test box 110 by the use of an interdeparture queue 101, which functions to store data representative of at least one selected traffic model, comprising both a pattern of data traffic and a traffic load. A traffic model is selected for each of a plurality of input streams, and multiple different traffic models can be concurrently supported. A departure scheduler 102 reads this stored data out of the lists maintained by the interdeparture queue 101 to identify the temporal relationships of data outputs among the plurality of input data streams. The departure scheduler 102 identifies the desired time of departure of each data packet as well as the selected stream from which the data packet originates. The departure scheduler 102 drives a traffic generator 103, which produces the resultant output data stream for transmission to the equipment under test 106.

The traffic generator 103 produces data packets for each of the output data streams and releases the generated packets into these streams at a time designated by the departure scheduler 102. An equipment specific interface 104 may optionally be provided to interconnect the traffic generator 103 to the equipment under test 106 or the data communication medium 107. The equipment specific interface 104 functions to provide the physical interconnection as well as the protocol conversion necessary to enable the traffic generator output to be presented to the equipment under test 106.

The various components and their functions are described in greater detail U.S. Pat. No. 6,028,847 entitled "Multiple Stream Traffic Emulator," which is hereby incorporated by reference.

The stream generator of the present invention effectively tests equipment (e.g., an IP router), by configuring routes (e.g., network addresses) in the forwarding table that consist of many different network sizes and network addresses, which can be non-consecutive. In the exemplary test system, a routing protocol called BGP4 is used for such a purpose, but other schemes may be employed for such a purpose.

Traffic Stream Generator 103

Figure 2:
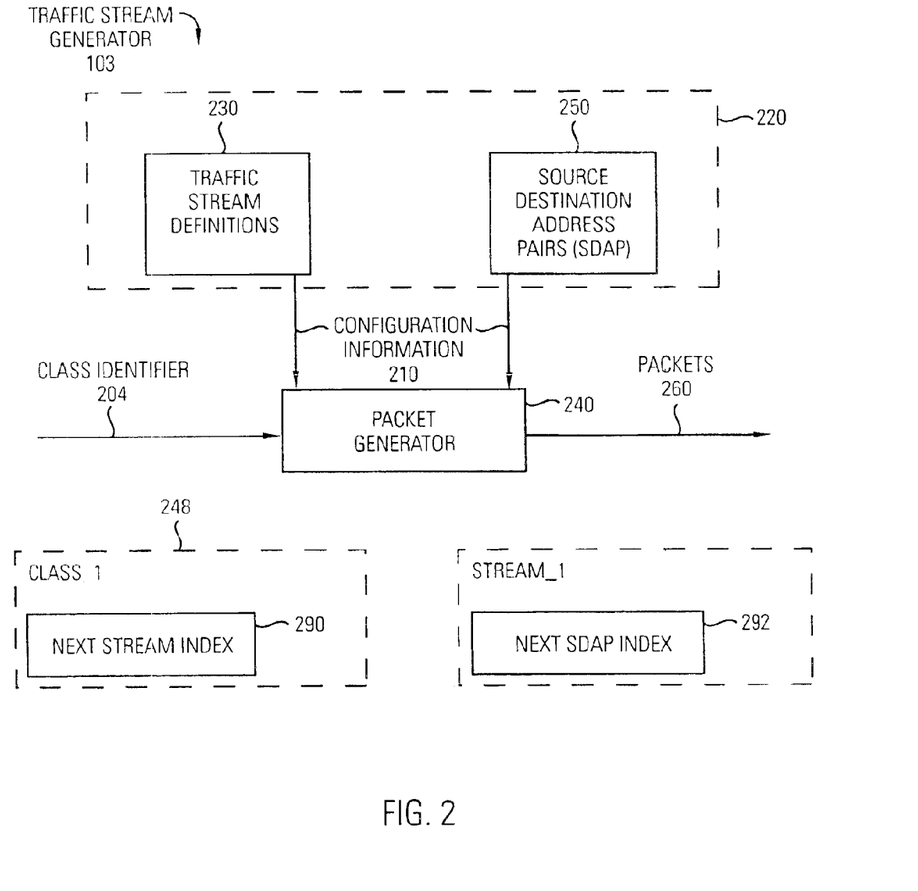
FIG. 2 is a block diagram illustrating in greater detail the traffic stream generator of FIG. 1 configured in accordance with a first embodiment of the present invention.

FIG. 2 is a block diagram illustrating in greater detail the traffic stream generator 103 of FIG. 1 configured in accordance with a first embodiment of the present invention. The traffic stream generator 103 includes a storage 220 and a packet generator 240. The storage 220 includes a packet template area 230 for storing traffic stream definitions and a source/destination address pair (SDAP) area 250 for storing SDAP definitions. As described in greater detail hereinafter, each traffic class or profile can be associated with multiple traffic streams, and each traffic stream can be associated with multiple source destination address pairs.

The stream generator 103 has a first input for receiving a traffic class identifier 204 that can be provided by the departure scheduler 102 and a second input for receiving configuration information 210. For example, the configuration information 210 can be, but is not limited to, the traffic stream definitions and SDAP definitions that are loaded into the traffic stream definitions module 230 and the source/destination address pair (SDAP) definitions module 250, respectively.

The packet generator 240 employs one or more traffic class templates 248. Each traffic class template 248 has a traffic stream (TS) pointer 290 and a SDAP pointer 292. The traffic stream (TS) pointer 290 tracks the next traffic stream for a particular traffic class, and the SDAP pointer for tracks the next SDAP for a particular traffic stream. The packet generator 240 manages the traffic stream (TS) pointer 290 and the SDAP pointer 292 and uses the TS definitions and SDAP definitions to fill in the traffic class template 248 based on the pointers 290 and 292. The packet generator 240 provides a user a greater ability to define and control the traffic to route to a device under test (DUT).

The packet generator 240 generates data packets 260 based on the traffic class identifier 204, the next stream index (a TS pointer) and a next SDAP index (a SDAP pointer). The packet generator 240 assembles or encapsulates the information into a packet that is then ready for transmission to the equipment under test 120. The operation of the packet generator 240 is further described with reference to FIG. 3.

Operation of the Traffic Stream Generator 103

Figure 3:
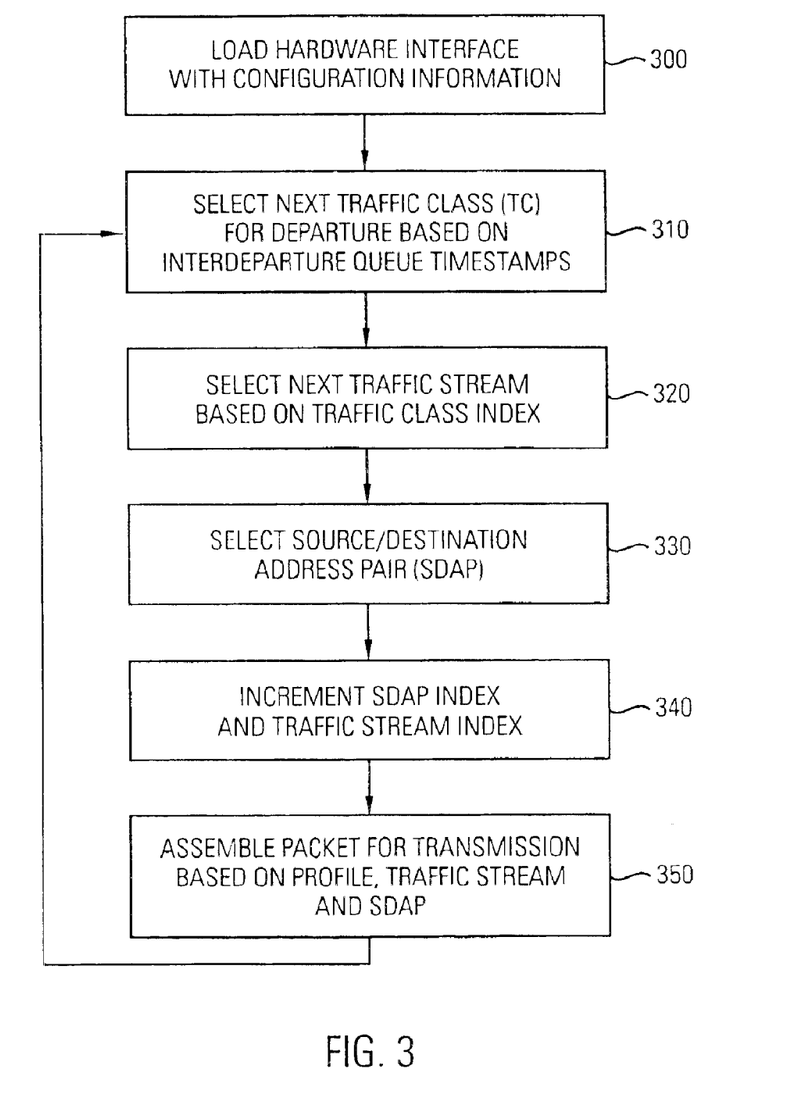
FIG. 3 is a flow chart illustrating the steps performed by the traffic stream generator of FIG. 1 in accordance with one embodiment of the present invention.

FIG. 3 is a flow chart illustrating the steps performed by the traffic stream generator 103 of FIG. 1 in accordance with one embodiment of the present invention. In step 300, configuration information is first loaded into the hardware interface 104. This configuration information can include, but is not limited to, traffic class departure information (e.g., information related to when a traffic class is scheduled for departure), traffic class definitions, traffic stream definitions, and SDAP definitions. For example, the inter-departure queue 101 can be loaded with traffic class departure information, and the stream generator 103 can be loaded with traffic class definitions, traffic stream definitions, and SDAP definitions.

In step 310, a next traffic class (TC) is selected for departure based on the traffic class definitions stored in the interdeparture queue (e.g., interdeparture queue timestamps). Step 310 can include the sub-steps of generating a traffic class identifier based on interdeparture queue timestamps and of receiving the traffic class identifier for identifying the next traffic class. The inter-departure queue 101 selects a next traffic class for departure based on the traffic class departure information and provides the traffic class identifier to the packet generator 240.

In step 320, the packet generator 182 selects a next traffic stream in the selected traffic class based on a traffic stream (TS) index. Each traffic class can have a plurality of traffic streams. These traffic streams can be managed as a list. For example, the traffic streams can be implemented as a linked list.

In one implementation, the traffic stream index (also referred to as a TS pointer) can be an index into the linked list that points to a current traffic stream for the selected traffic class. As will be explained hereinafter in step 340, the TS pointer is managed (e.g., incremented) so that after the current traffic stream is processed, the TS pointer is made to point to the next traffic stream in preparation for a subsequent pass through a particular traffic class.

In step 330, the packet generator 182 selects a source/destination address pair (SDAP) for the selected traffic stream based on a source/destination address (SDAP) pointer (herein also referred to as the SDAP index). Each traffic stream can have a plurality of SDAPs. These SDAPS can be managed as a list. For example, the SDAPs can be implemented as a linked list. In one implementation, the SDAP index can be a pointer into a linked list that points to a current SDAP. As will be explained hereinafter in step 340, the SDAP index is managed (e.g., incremented) so that after the current SDAP is processed the SDAP index is made to point to the next SDAP in preparation for a subsequent pass through a particular traffic stream.

One aspect of the present invention is the provision of multiple sets of SDAPs that can be associated with a selected traffic stream, where these sets can include discontinuous destination addresses. In the prior art, the incremental counter scheme could only offer a continuous range of address, which unfortunately does not realistically model Internet traffic. The present invention provides a mechanism to allow a user to define sets of SDAPs that each can include discontinuous addresses that more accurately reflect real Internet traffic.

In the preferred embodiment, the traffic generator 103 programs each output port of the equipment under test 120 with the set of addresses that are to be routed to that output port. Thereafter, in step 330 when a particular source/destination address pair is provided, a packet with that SDAP should be routed to that output port having a set of SDAPs that includes the current SDAP. In this manner, the accuracy of the equipment under test 120 can be ascertained.

In step 340, the TS index and the SDAP index are updated (e.g., incremented). In the preferred embodiment, the traffic streams and the SDAP are designed in a linked list where the tail of the list points to the head of the list. With such a circular configuration, the traffic streams are processed in turn for each traffic class. Similarly, the SDAPs are processed in turn for each traffic stream.

In step 350, the packet generator 182 assembles a packet for transmission based on the selected traffic class, traffic stream, and SDAP. The processing then continues at step 310 where a next traffic class is received.

It is noted that the traffic classes, traffic streams, source-destination address pairs, and their related definitions can be predetermined or otherwise pre-configured by a user to suit the requirements of a particular testing application.

Figure 4:
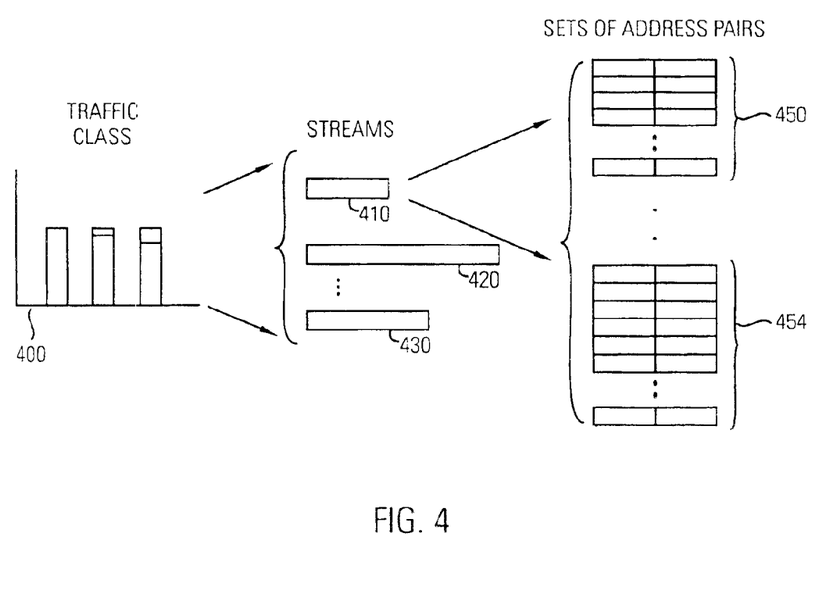
FIG. 4 illustrates a schematic diagram of the traffic classes, streams, and address pairs utilized by the present invention.

FIG. 4 illustrates a schematic diagram of the traffic classes, streams, and address pairs utilized by the present invention. A traffic class is defined as a profile for describing the contents or nature of the traffic and common attributes of traffic streams that belong to the traffic class. Some common attributes may be packet length or packet contents so as to model certain real life application traffic.

In one embodiment, the following traffic classes are utilized:

(1) Differentiated Services: Gold, Silver, Bronze;

(2) Types of Service: high precedence, low delay, high throughput;

(3) Applications: Video, Voice, Web, E-mail;

(4) Traffic Patterns: Short packets, bursty data;

(5) Packet Types: TCP data, TCP acknowledgments.

The traffic class 400 can be, for example, a constant load traffic class or a burst load traffic class. In this case, the traffic class 400 features a burst load. The class 400 can have associated therewith a plurality of different traffic streams. Three exemplary traffic streams are as follows: a first traffic stream 410, a second traffic stream 420, and a third traffic stream 430. It is noted that the data contents and the length of each traffic stream can be selectively modified (e.g., programmed) by the user.

For the first traffic stream there can be associated therewith a plurality of sets of address pairs, such as a first set of address pairs 450 and a second set of address pairs 454. As noted previously, one aspect of the present invention is the provision of a mechanism to allow a user to define sets of address pairs where the destination addresses, for example, are discontinuous or not consecutive. By allowing the user to specify a plurality of destination addresses that are not consecutive, the test generator provides IP datagrams that more accurately reflect the actual operating conditions of the equipment under test 120.

In one example, there are a plurality of traffic streams (e.g., traffic stream_1, traffic stream_2 . . . , traffic stream_P) that are associated with a particular traffic class (also referred to as a traffic profile). Each traffic stream is associated with one or more source-destination address pairs. For example, traffic stream_1 is associated with SDAP set_1, SDAP set_1, . . . SDAP set_Q and traffic stream_P is associated with SDAP set_1, SDAP set_1, . . . SDAP set_Q.

Exemplary Traffic Generation Model

Figure 5:
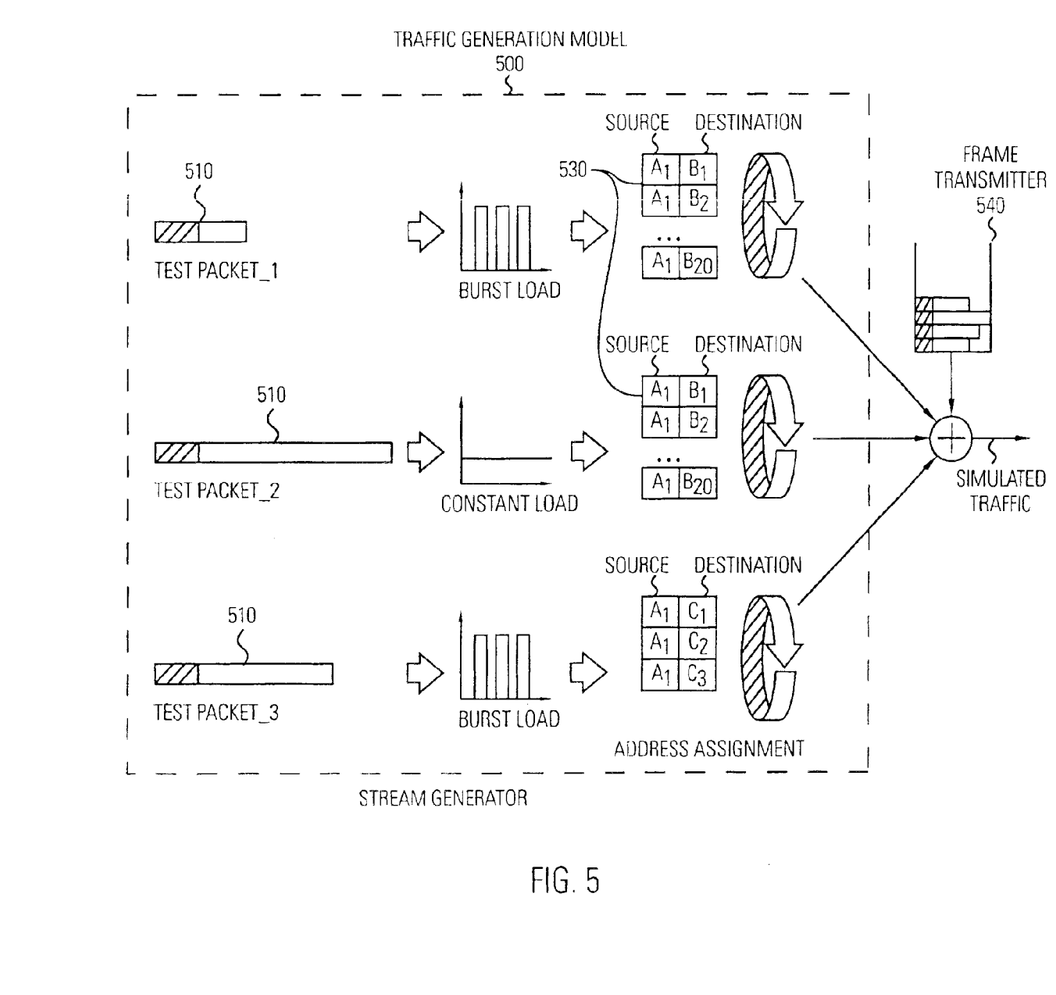
FIG. 5 illustrates an exemplary traffic generation model in accordance with one embodiment of the present invention.

FIG. 5 illustrates an exemplary traffic generation model in accordance with one embodiment of the present invention. A purpose of the traffic stream generator of the present invention is to simulate realistic network traffic (e.g., realistic Internet traffic). The simulation of realistic Internet traffic requires the generation of a large number of IP addresses (e.g., thousands of IP addresses), the simultaneous generation of different traffic classes (e.g., tens of traffic classes), and the ability to have this traffic forwarded between different ports of the SUT (e.g., hundreds of streams or aggregate flows)

The exemplary traffic generation model 500 can be utilized to generate realistic Internet traffic. Different test packets 510 (e.g., test packet_1, test packet_2, and test packet_3), different types of loads 520 (e.g., burst load and constant load), and source destination pairs 530 for use with address assignment are combined with a frame transmitter 540 to accomplish the generation of realistic Internet traffic.

According to one embodiment, the traffic generator of the present invention performs the following functions. First, the traffic generator of the present invention sends packets to thousands of IP addresses simultaneously. These addresses are synchronized with the contents of the routing table of the routers (e.g., IP routers) so that the packets are forwarded to a predictable output port. Thousands of simultaneous application flows can be simulated in this manner.

Second, the traffic generator of the present invention sends packets between multiple ports of a router. Each traffic source needs to be able to send packets to the input port of a router with addresses configured so that the packets are forwarded by the router to a large number of different output ports. For example, backbone routers can have hundreds of ports. The traffic generator of the present invention sends packets in a controlled fashion so that the test system can verify that the router under test correctly forwards the packets. The traffic generator of the present invention exercises the switching fabric and buffering mechanisms of the router in this manner.

Third, the traffic generator of the present invention sends different traffic classes simultaneously. Traffic classes are employed to model typical traffic types in the Internet (e.g., data flows, web hits, voice traffic, video traffic, etc.). Traffic classes can also be utilized to model different priority traffic that may be identified by the TOS/DS bytes in the IP header. The traffic generator of the present invention can model tens of different traffic classes simultaneously. In one embodiment, the traffic generator of the present invention sends minimum sized IP packets with the above-described traits at line rates of up to 2.4 Gbps.

Exemplary Test System 600

Figure 6:
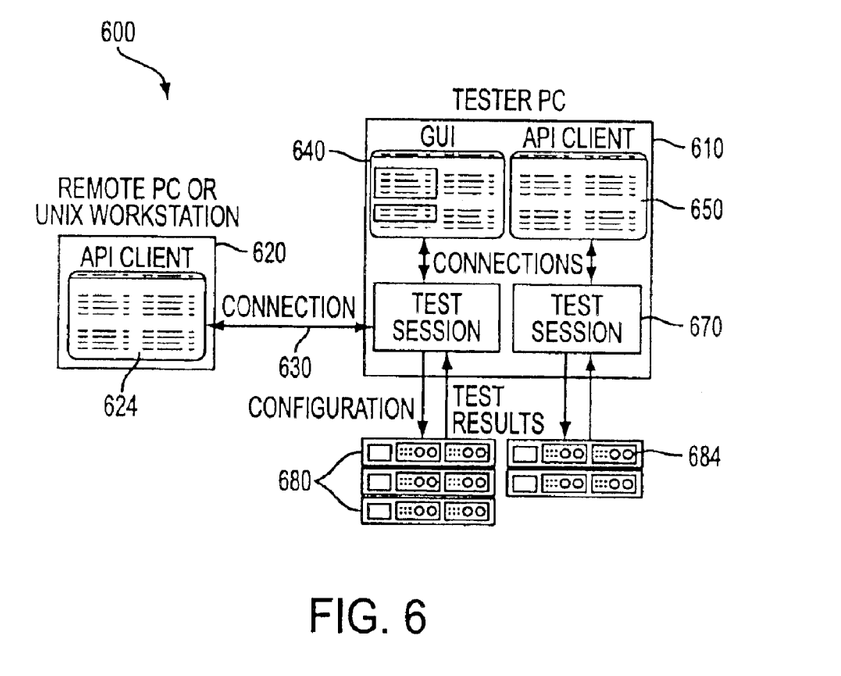
FIG. 6 illustrates an exemplary test system in which the traffic stream generator of the present invention can be implemented.

FIG. 6 illustrates an exemplary test system in which the traffic stream generator of the present invention can be implemented. The test system 600 includes a tester personal computer (PC) 610, which can be a Windows-based host, coupled to a remote personal computer (PC) 620, which can be a UNIX workstation, through a connection 630. The connection 630 is preferably a general-purpose, line-oriented TCP socket connection through which string messages can be communicated.

The remote PC 620 includes a client 624 that requires access to COM objects that reside on the tester PC 610. The tester PC 610 can include a graphical user interface (GUI) module 640 for interfacing with a user, and can also include one or more clients 650 that also require access to COM objects. The clients 624 and 650 can be a scripting language shell (e.g., a Tcl shell) that sources commands from a script program (that can be written by a user) or processes commands that are entered through a standard user input.

The tester PC 610 can also include one or more test sessions 670 that can be run concurrently. Each test session is an instantiation of the tester software on the tester PC 610. The test session 670 reserves contiguous blocks of test modules 680 for its exclusive use. The test modules 680 include ports 684 for making real-time measurements and for passing results back to the test session. In addition, each test session 670 can be connected to multiple clients (e.g., 624 and 650) and the GUI module 640 and processes commands received therefrom.

For example, each port can simulate a router with many reachable IP network addresses. The port simulations enable the test system to coordinate the operation of a routing protocol, such as BGP-4 with the IP addresses used for traffic generation. A user can select the port simulation and a desired multi-port traffic pattern. The system can also automatically assign IP addresses to traffic streams to provide a desired traffic.

The stream generator of the present invention is employed to generate a controlled load of IP datagrams. Many different test packets can be multiplexed together, thereby simulating an aggregation of traffic flows between many IP nodes. In one exemplary embodiment, for each test port, the stream generator can support 1) 15 classes, 2) 256 traffic streams, and 3) a minimum of 65536 possible source and destination address pairs. The traffic class is defined by 1) packet contents, 2) packet length, and 3) traffic profile.

Traffic classes can be configured according to a predetermined level of discrimination set by a user when analyzing performance measurements. For example, one test may require the ability to generate different categories of Internet traffic, such as HTTP, Telnet, or FTP to determine if latency and loss characteristics of the categories vary. In another example, a test sends long bursts of traffic simultaneously with a constant background load. In yet another example, a test measures the simultaneous effects of a mix of long and short packets on the SUT. In this regard, preferably, the test system supports multiple simultaneous traffic classes per port in order to test for fairness or processing discrepancies within the SUT.

A traffic stream can be defined by 1) an associated traffic class, 2) the source port, 3) the destination port (e.g., a particular port or an IP address), and 4) a set of source/destination IP address pairs. At each source port, multiple streams can share the same traffic class. Streams are assigned destination addresses so that they can be forwarded to the desired destination port. Traffic streams allow the user to define a mesh of traffic such that traffic generated from each source port can be sent to a variety of destination ports.

Each stream can also be assigned to a range of address pairs, thereby enabling the test system to simulate the generation of traffic from and to a large number of different network addresses. Such traffic is required to exercise the route table look up and cache functionality within the SUT. Addresses may be selected from the range of addresses assigned to the simulated networks at the source and destination of the stream. A traffic stream can be used as a unit of measurement in the test system. Statistics can then be collected on a per-port or per-stream basis.

Consequently, the stream generator of the present invention allows one to flexibly test how a device under test (DUT) handles different Internet applications (e.g., voice data, video data, web data, and electronic mail data), how the DUT handles types of services (ToS) (e.g., precedence, delay, throughput, and reliability, and how the DUT handles differentiated services (e.g., gold services, silver services and bronze services). Moreover, the stream generator of the present invention allows one to flexibly stress the device under test (DUT) with different traffic conditions. These traffic conditions can include, but are not limited to, many short packets, a mix of long and short packets sent simultaneously, long packet bursts against constant background traffic, packets over-subscribed to a DUT queue, back-to-back packets or bursts, packets of incrementing lengths or with random payload contents, packets sent to a specific unicast or multicast IP addresses, and data having errors. As can be appreciated, the traffic stream generator of the present invention allows one to flexibly devise complex aggregations to approximate real-world conditions in a live network.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus for testing equipment comprising:
   a) a storage having a packet template area for storing at least a first packet template and a second packet template and a source/destination address pair area for storing at least a first set of source/destination address pairs; wherein the source/destination address pairs are configurable to simulate non-consecutive network traffic; and
   b) a stream generator coupled to the storage for receiving a profile identifier and responsive thereto for dynamically accessing the packet template area corresponding to the profile specified by the profile identifier for at least one packet template and for accessing the source/destination address pairs corresponding to the packet template for at least one address pair, and for building a test packet that includes the accessed packet template and the accessed address pair.

2. The apparatus of claim 1 wherein the source/destination address pairs in the source/destination address pair area are generated based on a plurality of configuration parameters that are loaded to a device under test.

3. The apparatus of claim 2 wherein at least one the source/destination address pair is written with the destination address for one port of the device under test.

4. The apparatus of claim 1 further comprising:
   a first association mechanism for associating a profile with more than one packet template.

5. The apparatus of claim 1 further comprising:
   a second association mechanism for associating a packet template with more than one source/destination address pairs.

6. The apparatus of claim 1 wherein the non-consecutive network traffic includes Internet traffic.

7. An apparatus for testing equipment having a plurality of output ports comprising:
   a) a scheduler for generating a profile identifier signal;
   b) traffic generator coupled to the scheduler for receiving the profile identifier signal, configuration information, at least two profiles, two traffic streams, and two source destination address pairs (SDAPs); for selecting a particular profile, traffic stream, and SDAP; and
   c) a packet assembler coupled to the traffic generator for encapsulating the profile, traffic stream, and SDAP information into a data packet that is ready for transmission to the equipment under test.

8. The apparatus of claim 7 wherein
   the traffic generator includes a mechanism for generating destination addresses that are selected from a set of addresses that are non-consecutive.

9. The apparatus of claim 8 wherein the traffic generator includes a mechanism for associating a plurality of sets of non-consecutive destination addresses with a traffic stream.

10. The apparatus of claim 8 wherein the apparatus simulates Internet traffic.

11. The apparatus of claim 8 wherein the traffic generator includes a mechanism for associating a plurality of traffic streams with each traffic class.

12. A method of generating test packets comprising:
   (a) receiving configuration information that includes traffic class definitions, traffic stream definitions, and source-destination address pairs;
   (b) selecting a profile from at least two different profiles based on a traffic class identifier signal;
   (c) selecting a traffic stream from at least two different traffic streams for the traffic class based on a traffic class index; and (d) selecting a source/destination address pair from at least two different source/destination address pair for the traffic stream based on a SDAP index for generating the test packets ready for transmission to the equipment under test.

13. The method of claim 12 wherein the traffic class definitions includes one of packet contents, packet length, and traffic profile.

14. The method of claim 12 wherein the traffic stream definitions includes one of a packet template and an intended destination address.

15. The method of claim 12 wherein the traffic stream definitions includes one of an associated traffic class, a source port, a destination port, and a set of source/destination IP address pairs.

16. The method of claim 15 wherein the destination port includes one of a particular port and an IP address.

17. The method of claim 15 wherein at each source port, multiple streams can share the same traffic class; and wherein streams are assigned destination addresses for forwarding to a desired destination port.

18. The method of claim 15 wherein traffic streams allow a user to define a mesh of traffic; wherein the traffic generated from each source port is sent to a plurality of different destination ports.

19. The method of claim 12 wherein the destination addresses of the two different source/destination address pairs are not consecutive.

* * * * *

UNITED STATES PATENT AND TRADEMARK OFFICE
CERTIFICATE OF CORRECTION

PATENT NO.     : 6,950,405 B2
DATED          : September 27, 2005
INVENTOR(S)    : Van Gerrevink It is certified that error appears in the above-identified patent and that said Letters Patent is hereby corrected as shown below:

Column 10,
Line 22, after "one" insert -- of --.

Signed and Sealed this

Tenth Day of January, 2006

JON W. DUDAS
*Director of the United States Patent and Trademark Office*